United States Patent [19]
Bogdan

[11] Patent Number: 6,059,960
[45] Date of Patent: *May 9, 2000

[54] CATALYTIC REFORMING UTILIZING A SELECTIVE BIFUNCTIONAL MULTIMETALLIC REFORMING CATALYST

[75] Inventor: Paula L. Bogdan, Mount Prospect, Ill.

[73] Assignee: UOP LLC, Des Plaines, Ill.

[ * ] Notice: This patent is subject to a terminal disclaimer.

[21] Appl. No.: 09/118,254

[22] Filed: Jul. 17, 1998

Related U.S. Application Data

[63] Continuation-in-part of application No. 08/815,547, Mar. 12, 1997, abandoned, which is a continuation-in-part of application No. 08/463,450, Jun. 5, 1995, Pat. No. 5,665,223.

[51] Int. Cl.[7] .................. C10G 35/085; C10G 35/06
[52] U.S. Cl. .................. 208/139; 208/134; 208/135; 208/138
[58] Field of Search .................. 208/134, 135, 208/138, 139

[56] References Cited

U.S. PATENT DOCUMENTS

| | | | |
|---|---|---|---|
| 3,686,340 | 8/1972 | Patrick et al. | 208/138 |
| 3,776,860 | 12/1973 | Rai | 502/230 |
| 3,915,845 | 10/1975 | Antos | 208/139 |
| 4,003,826 | 1/1977 | Antos | 208/139 |
| 4,039,477 | 8/1977 | Engelhard et al. | 252/441 |
| 4,148,715 | 4/1979 | Antos | 208/139 |
| 4,227,993 | 10/1980 | Engelhard et al. | 208/139 |
| 4,234,458 | 11/1980 | Antos | 252/441 |
| 4,886,928 | 12/1989 | Imai et al. | 585/660 |
| 5,208,200 | 5/1993 | Soled et al. | 502/241 |
| 5,254,518 | 10/1993 | Soled et al. | 502/241 |
| 5,457,253 | 10/1995 | Soled et al. | 585/419 |
| 5,665,223 | 9/1997 | Bogdan | 208/138 |

*Primary Examiner*—Walter D. Griffin
*Attorney, Agent, or Firm*—John G. Tolomei; Frank S. Molinaro; Thomas J. McBride, Jr.

[57] ABSTRACT

A novel catalyst and the use thereof in a reforming process is disclosed. The catalyst comprises a refractory inorganic oxide, platinum-group metal, Group IVA(IUPAC 14) metal, and lanthanide-series metal in a specified ratio. Utilization of this catalyst in the reforming of hydrocarbons, especially in reforming, results in significantly improved selectivity to the desired gasoline or aromatics product.

7 Claims, 4 Drawing Sheets

CATALYTIC REFORMING UTILIZING A SELECTIVE BIFUNCTIONAL MULTIMETALLIC REFORMING CATALYST

CROSS REFERENCE TO RELATED APPLICATION

This application is a continuation-in-part of prior application Ser. No. 08/815,547, filed Mar. 12, 1997, now abandoned, which is a continuation-in-part of prior application Ser. No. 08/463,450, filed Jun. 5, 1995, U.S. Pat. No. 5,665,223, the contents of both of which are incorporated herein by reference thereto.

FIELD OF THE INVENTION

This invention relates to an improved catalyst for the conversion of hydrocarbons, and more specifically for the catalytic reforming of gasoline-range hydrocarbons.

BACKGROUND OF THE INVENTION

The subject of the present invention is a novel dual-function catalytic composite, characterized by a combination of three or more metals in specified concentrations on the finished catalyst, and its use in hydrocarbon conversion. Catalysts having both a hydrogenation-dehydrogenation function and a cracking function are used widely in many applications, particularly in the petroleum and petrochemical industry, to accelerate a wide spectrum of hydrocarbon-conversion reactions. The cracking function generally relates to an acid-action material of the porous, adsorptive, refractory-oxide type which is typically utilized as the support or carrier for a heavy-metal component, such as the Group VIII(IUPAC 8–10) metals, which primarily contributes the hydrogenation-dehydrogenation function. Other metals in combined or elemental form can influence one or both of the cracking and hydrogenation-dehydrogenation functions.

In another aspect, the present invention comprehends improved processes that emanate from the use of the novel catalyst. These dual-function catalysts are used to accelerate a wide variety of hydrocarbon-conversion reactions such as dehydrogenation, hydrogenation, hydrocracking, hydrogenolysis, isomerization, desulfurization, cyclization, alkylation, polymerization, cracking, and hydroisomerization. In a specific aspect, an improved reforming process utilizes the subject catalyst to increase selectivity to gasoline and aromatics products.

Catalytic reforming involves a number of competing processes or reaction sequences. These include dehydrogenation of cyclohexanes to aromatics, dehydroisomerization of alkylcyclopentanes to aromatics, dehydrocyclization of an acyclic hydrocarbon to aromatics, hydrocracking of paraffins to light products boiling outside the gasoline range, dealkylation of alkylbenzenes and isomerization of paraffins. Some of the reactions occurring during reforming, such as hydrocracking which produces light paraffin gases, have a deleterious effect on the yield of products boiling in the gasoline range. Process improvements in catalytic reforming thus are targeted toward enhancing those reactions effecting a higher yield of the gasoline fraction at a given octane number.

It is of critical importance that a dual-function catalyst exhibit the capability both to initially perform its specified functions efficiently and to perform them satisfactorily for prolonged periods of time. The parameters used in the art to measure how well a particular catalyst performs its intended functions in a particular hydrocarbon reaction environment are activity, selectivity and stability. In a reforming environment, these parameters are defined as follows:

(1) Activity is a measure of the ability of the catalyst to convert hydrocarbon reactants to products at a designated severity level, with severity level representing a combination of reaction conditions: temperature, pressure, contact time, and hydrogen partial pressure. Activity typically is characterized as the octane number of the pentanes and heavier ("$C_5+$") product stream from a given feedstock at a given severity level, or conversely as the temperature required to achieve a given octane number.

(2) Selectivity refers to the percentage yield of petrochemical aromatics or $C_5+$ gasoline product from a given feedstock at a particular activity level.

(3) Stability refers to the rate of change of activity or selectivity per unit of time or of feedstock processed. Activity stability generally is measured as the rate of change of operating temperature per unit of time or of feedstock to achieve a given $C_5+$ product octane, with a lower rate of temperature change corresponding to better activity stability, since catalytic reforming units typically operate at relatively constant product octane. Selectivity stability is measured as the rate of decrease of $C_5+$ product or aromatics yield per unit of time or of feedstock.

Programs to improve performance of reforming catalysts are being stimulated by the reformulation of gasoline, following upon widespread removal of lead antiknock additive, in order to reduce harmful vehicle emissions. Gasoline-upgrading processes such as catalytic reforming must operate at higher efficiency with greater flexibility in order to meet these changing requirements. Catalyst selectivity is becoming ever more important to tailor gasoline components to these needs while avoiding losses to lower-value products. The major problem facing workers in this area of the art, therefore, is to develop more selective catalysts while maintaining effective catalyst activity and stability.

The art teaches a variety of multimetallic catalysts for the catalytic reforming of naphtha feedstocks. Most of these comprise a selection of platinum-group metals, rhenium, and Group IVA(IUPAC 14) metals.

U.S. Pat. No. 3,915,845 (Antos) discloses hydrocarbon conversion with a catalyst comprising a platinum-group metal, Group IVA metal, halogen and lanthanide in an atomic ratio to platinum-group metal of 0.1 to 1.25; and U.S. Pat. No. 4,234,458 teaches the same components plus nickel. The preferred lanthanides are lanthanum, cerium, and especially neodymium which was exemplified in Antos, who does not recognize the benefits of lanthanides forming +2 as well as +3 oxides. U.S. Pat. No. 4,039,477 (Engelhard et al.) discloses a catalyst for the catalytic hydrotreatment of hydrocarbons comprising a refractory metal oxide, platinum-group metal, tin and at least one metal from yttrium, thorium, uranium, praseodymium, cerium, lanthanum, neodymium, samarium, dysprosium and gadolinium with favorable results being observed at relatively low ratios of the latter metals to platinum. U.S. Pat. No. 5,254,518 (Soled et al.) teaches a catalyst containing a Group VIII noble metal, Group IVB oxide and amorphous silica-alumina on which a rare earth oxide, preferably neodymium or yttrium, is deposited.

SUMMARY OF THE INVENTION

It is an object of the invention to provide a novel catalyst for improved selectivity in hydrocarbon conversion. A corollary object of the invention is to provide a reforming process having improved selectivity with respect to gasoline or aromatics yields.

The invention originates from the discovery that a catalyst containing platinum, tin and europium on chlorided alumina shows a favorable ratio of aromatization to cracking in a reforming reaction.

A broad embodiment of the present invention is a catalyst comprising a refractory inorganic oxide, a Group IVA (IUPAC 14) metal, a platinum-group metal, and a lanthanide-series metal. The atomic ratio of lanthanide metal to platinum-group metal preferably is at least about 1.3:1, more preferably about 1.5:1 or more, and most preferably from about 2:1 to 5:1. The catalyst optimally also comprises a halogen, especially chlorine. In preferred embodiments the refractory inorganic oxide is alumina, and the Group IVA (IUPAC 14) metal is tin, the platinum-group metal is platinum, and the lanthanide-series metal is selected from at least one of europium, samarium and ytterbium which uncommonly form +2 as well as +3 oxides. A highly preferred catalyst comprises tin, platinum and europium mostly in the form of EuO on an alumina support.

In another aspect, the invention is a process for the conversion of a hydrocarbon feedstock utilizing the present catalyst. Preferably the hydrocarbon conversion is catalytic reforming of a naphtha feedstock, utilizing the catalyst of the invention to increase the yield of gasoline and/or aromatics. The conversion more preferably comprises dehydrocyclization to increase aromatics yields. Optimally the naphtha feedstock comprises hydrocarbons in the $C_6$–$C_8$ range which yield one or more of benzene, toluene and xylenes in a catalytic reforming unit.

These as well as other objects and embodiments will become evident from the following more detailed description of the present invention.

DESCRIPTION OF THE PREFERRED EMBODIMENTS

A broad embodiment of the present invention, therefore, is a catalyst comprising a refractory inorganic-oxide support, at least one metal of Group IVA(IUPAC 14) of the Periodic Table [See Cotton and Wilkinson, *Advanced Inorganic Chemistry*, John Wiley & Sons (Fifth Edition, 1988)], a platinum-group metal, and a lanthanide-series metal.

The refractory support utilized in the present invention usually is a porous, adsorptive, high-surface area support having a surface area of about 25 to about 500 $m^2/g$. The porous carrier material should also be uniform in composition and relatively refractory to the conditions utilized in the hydrocarbon conversion process. By the terms "uniform in composition" it is meant that the support be unlayered, has no concentration gradients of the species inherent to its composition, and is completely homogeneous in composition. Thus, if the support is a mixture of two or more refractory materials, the relative amounts of these materials will be constant and uniform throughout the entire support. It is intended to include within the scope of the present invention carrier materials which have traditionally been utilized in dual-function hydrocarbon conversion catalysts such as:

(1) refractory inorganic oxides such as alumina, magnesia, titania, zirconia, chromia, zinc oxide, thoria, boria, silica-alumina, silica-magnesia, chromia-alumina, alumina-boria, silica-zirconia, etc.;

(2) ceramics, porcelain, bauxite;

(3) silica or silica gel, silicon carbide, clays and silicates which are synthetically prepared or naturally occurring, which may or may not be acid treated, for example attapulgus clay, diatomaceous earth, fuller's earth, kaolin, or kieselguhr;

(4) crystalline zeolitic aluminosilicates, such as X-zeolite, Y-zeolite, mordenite, β-zeolite, Ω-zeolite or L-zeolite, either in the hydrogen form or most preferably in nonacidic form with one or more alkali metals occupying the cationic exchangeable sites;

(5) non-zeolitic molecular sieves, such as aluminophosphates or silico-alumino-phosphates; and (6) combinations of one or more materials from one or more of these groups.

Preferably the refractory support comprises one or more inorganic oxides, with the preferred refractory inorganic oxide for use in the present invention being alumina. Suitable alumina materials are the crystalline aluminas known as the gamma-, eta-, and theta-alumina, with gamma- or eta-alumina giving best results. The preferred refractory inorganic oxide will have an apparent bulk density of about 0.3 to about 1.0 g/cc and surface area characteristics such that the average pore diameter is about 20 to 300 angstroms, the pore volume is about 0.1 to about 1 cc/g, and the surface area is about 100 to about 500 $m^2/g$.

Considering that alumina is the preferred refractory inorganic oxide, a particularly preferred alumina is that which has been characterized in U.S. Pat. Nos. 3,852,190 and 4,012,313 as a by-product from a Ziegler higher alcohol synthesis reaction as described in Ziegler's U.S. Pat. No. 2,892,858. For purposes of simplification, such an alumina will be hereinafter referred to as a "Ziegler alumina". Ziegler alumina is presently available from the Vista Chemical Company under the trademark "Catapal" or from Condea Chemie GmbH under the trademark "Pural." This material is an extremely high purity pseudoboehmite which, after calcination at a high temperature, has been shown to yield a high purity gamma-alumina.

The alumina powder can be formed into any desired shape or type of carrier material known to those skilled in the art such as spheres, rods, pills, pellets, tablets, granules, extrudates, and like forms by methods well known to the practitioners of the catalyst material forming art.

The preferred form of the present catalyst support is a sphere. Alumina spheres may be continuously manufactured by the well known oil-drop method which comprises: forming an alumina hydrosol by any of the techniques taught in the art and preferably by reacting aluminum metal with hydrochloric acid; combining the resulting hydrosol with a suitable gelling agent; and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging and drying treatments in oil and an ammoniacal solution to further improve their physical characteristics. The resulting aged and gelled particles are then washed and dried at a relatively low temperature of about 150° to about 205° C. and subjected to a calcination procedure at a temperature of about 450° to about 700° C. for a period of about 1 to about 20 hours. This treatment effects conversion of the alumina hydrogel to the corresponding crystalline gamma-alumina. U.S. Pat. No. 2,620,314 provides for additional details and is incorporated herein by reference thereto.

An alternative form of carrier material is a cylindrical extrudate, preferably prepared by mixing the alumina powder with water and suitable peptizing agents such as HCl until an extrudable dough is formed. The amount of water added to form the dough is typically sufficient to give a loss on ignition (LOI) at 500° C. of about 45 to 65 mass %, with a value of 55 mass % being preferred. The acid addition rate is generally sufficient to provide 2 to 7 mass % of the volatile-free alumina powder used in the mix, with a value of 3 to 4 mass % being preferred. The resulting dough is extruded through a suitably sized die to form extrudate particles. These particles are then dried at a temperature of about 260° to about 427° C. for a period of about 0.1 to 5 hours to form the extrudate particles. It is preferred that the refractory inorganic oxide comprise substantially pure Ziegler alumina having an apparent bulk density of about 0.6 to about 1 g/cc and a surface area of about 150 to 280 $m^2/g$ (preferably 185 to 235 $m^2/g$, at a pore volume of 0.3 to 0.8 cc/g).

A Group IVA(IUPAC 14) metal component is an essential ingredient of the catalyst of the present invention. Of the Group IVA(IUPAC 14) metals, germanium and tin are preferred and tin is especially preferred. This component may be present as an elemental metal, as a chemical compound such as the oxide, sulfide, halide, oxychloride, etc., or as a physical or chemical combination with the porous carrier material and/or other components of the catalytic composite. Preferably, a substantial portion of the Group IVA(IUPAC 14) metal exists in the finished catalyst in an oxidation state above that of the elemental metal. The Group IVA(IUPAC 14) metal component optimally is utilized in an amount sufficient to result in a final catalytic composite containing about 0.01 to about 5 mass % metal, calculated on an elemental basis, with best results obtained at a level of about 0.1 to about 2 mass % metal.

The Group IVA(IUPAC 14) metal component may be incorporated in the catalyst in any suitable manner to achieve a homogeneous dispersion, such as by coprecipitation with the porous carrier material, ion-exchange with the carrier material or impregnation of the carrier material at any stage in the preparation. One method of incorporating the Group IVA(IUPAC 14) metal component into the catalyst composite involves the utilization of a soluble, decomposable compound of a Group IVA(IUPAC 14) metal to impregnate and disperse the metal throughout the porous carrier material. The Group IVA(IUPAC 14) metal component can be impregnated either prior to, simultaneously with, or after the other components are added to the carrier material. Thus, the Group IVA(IUPAC 14) metal component may be added to the carrier material by commingling the latter with an aqueous solution of a suitable metal salt or soluble compound such as stannous bromide, stannous chloride, stannic chloride, stannic chloride pentahydrate; or germanium oxide, germanium tetraethoxide, germanium tetrachloride; or lead nitrate, lead acetate, lead chlorate and the like compounds. The utilization of Group IVA(IUPAC 14) metal chloride compounds, such as stannic chloride, germanium tetrachloride or lead chlorate is particularly preferred since it facilitates the incorporation of both the metal component and at least a minor amount of the preferred halogen component in a single step. When combined with hydrogen chloride during the especially preferred alumina peptization step described hereinabove, a homogeneous dispersion of the Group IVA(IUPAC 14) metal component is obtained in accordance with the present invention. In an alternative embodiment, organic metal compounds such as trimethyltin chloride and dimethyltin dichloride are incorporated into the catalyst during the peptization of the inorganic oxide binder, and most preferably during peptization of alumina with hydrogen chloride or nitric acid.

Another essential ingredient of the catalyst is a platinum-group-metal component. This component comprises platinum, palladium, ruthenium, rhodium, iridium, osmium or mixtures thereof, with platinum being preferred. The platinum-group metal may exist within the final catalytic composite as a compound such as an oxide, sulfide, halide, oxyhalide, etc., in chemical combination with one or more of the other ingredients of the composite or as an elemental metal. Best results are obtained when substantially all of this component is present in the elemental state and it is homogeneously dispersed within the carrier material. This component may be present in the final catalyst composite in any amount which is catalytically effective; the platinum-group metal generally will comprise about 0.01 to about 2 mass % of the final catalytic composite, calculated on an elemental basis. Excellent results are obtained when the catalyst contains about 0.05 to about 1 mass % of platinum.

The platinum-group metal component may be incorporated in the porous carrier material in any suitable manner, such as coprecipitation, ion-exchange or impregnation. The preferred method of preparing the catalyst involves the utilization of a soluble, decomposable compound of platinum-group metal to impregnate the carrier material in a relatively uniform manner. For example, the component may be added to the support by commingling the latter with an aqueous solution of chloroplatinic or chloroiridic or chloropalladic acid. Other water-soluble compounds or complexes of platinum-group metals may be employed in impregnating solutions and include ammonium chloroplatinate, bromoplatinic acid, platinum trichloride, platinum tetrachloride hydrate, platinum dichlorocarbonyl dichloride, dinitrodiaminoplatinum, sodium tetranitroplatinate (II), palladium chloride, palladium nitrate, palladium sulfate, diamminepalladium (II) hydroxide, tetramminepalladium (II) chloride, hexamminerhodium chloride, rhodium carbonylchloride, rhodium trichloride hydrate, rhodium nitrate, sodium hexachlororhodate (III), sodium hexanitrorhodate (III), iridium tribromide, iridium dichloride, iridium tetrachloride, sodium hexanitroiridate (III), potassium or sodium chloroiridate, potassium rhodium oxalate, etc. The utilization of a platinum, iridium, rhodium, or palladium chloride compound, such as chloroplatinic, chloroiridic or chloropalladic acid or rhodium trichloride hydrate, is preferred since it facilitates the incorporation of both the platinum-group-metal component and at least a minor quantity of the preferred halogen component in a single step. Hydrogen chloride or the like acid is also generally added to the impregnation solution in order to further facilitate the incorporation of the halogen component and the uniform distribution of the metallic components throughout the carrier material. In addition, it is generally preferred to impregnate the carrier material after it has been calcined in order to minimize the risk of washing away the valuable platinum-group metal.

Generally the platinum-group metal component is dispersed homogeneously in the catalyst. Homogeneous dispersion of the platinum-group metal preferably is determined by Scanning Transmission Electron Microscope (STEM), comparing metals concentrations with overall catalyst metal content. In an alternative embodiment one or more platinum-group metal components may be present as a surface-layer component as described in U.S. Pat. No. 4,677,094, incorporated by reference. The "surface layer" is the layer of a catalyst particle adjacent to the surface of the particle, and the concentration of surface-layer metal tapers off in progressing from the surface to the center of the catalyst particle.

A lanthanide-series metal is another essential component of the present catalyst. Included in the lanthanide series are lanthanum, cerium, praseodymium, neodymium, promethium, samarium, europium, gadolinium, terbium, dysprosium, holmium, erbium, thulium, ytterbium and lutetium. Favored elements are those which are capable of forming stable +2 ions, i.e., Sm, Eu and Yb (*CRC Handbook of Chemistry and Physics*, 75th Edition 1994–1995, CRC Press, Inc.) with ytterbium and europium being preferred and europium being especially preferred. The lanthanide component may consist essentially of one of the favored elements or may comprise mixtures of elements, e.g., two parts ytterbium to one part europium on an elemental atomic basis. The lanthanide component may in general be present in the catalytic composite in any catalytically available form such as the elemental metal, a compound such as the oxide, hydroxide, halide, oxyhalide, aluminate, or in chemical combination with one or more of the other ingredients of the catalyst. Although not intended to so restrict the present invention, it is believed that best results are obtained when the lanthanide component is present in the composite in a form wherein substantially all of the lanthanide moiety is in an oxidation state above that of the elemental metal such as in the form of the oxide, oxyhalide or halide or in a mixture thereof and the subsequently described oxidation and reduction steps that are preferably used in the preparation of the instant catalytic composite are specifically designed to achieve this end. In a particularly advantageous embodiment, preparation steps and conditions are selected to effect the form of a favored lanthanide which forms stable +2 ions mostly (i.e., more than 50% of the lanthanide) as SmO, EuO and/or YbO. Optimally over 80% on an atomic basis of the lanthanide is present as the +2 oxide, e.g., the preferred ytterbium and europium as YbO and EuO, respectively. Since final reduction of the catalyst may be effected in situ in the reforming unit, the catalyst of the invention may show such oxide proportions either or both as manufactured or immediately prior to its use in a reforming process.

The lanthanide-metal component can be incorporated into the catalyst in any amount which is catalytically effective, with good results obtained with about 0.05 to about 5 mass % lanthanide on an elemental basis in the catalyst. Best results are ordinarily achieved with about 0.2 to about 2 mass % lanthanide, calculated on an elemental basis. The preferred atomic ratio of lanthanide to platinum group metal for this catalyst is at least about 1.3:1, preferably about 1.5:1 or greater, and especially from about 2:1 to about 5:1.

The lanthanide component is incorporated in the catalytic composite in any suitable manner known to the art, such as by coprecipitation, cogellation or coextrusion with the porous carrier material, ion exchange with the gelled carrier material, or impregnation of the porous carrier material either after, before, or during the period when it is dried and calcined. It is intended to include within the scope of the present invention all conventional methods for incorporating and simultaneously distributing a metallic component in a catalytic composite in a desired manner, as the particular method of incorporation used is not deemed to be an essential feature of the present invention. Preferably the method used results in a relatively uniform dispersion of the lanthanide moiety in the carrier material, although methods which result in non-uniform lanthanide distribution are within the scope of the present invention.

One suitable method of incorporating the lanthanide component into the catalytic composite involves cogelling or coprecipitating the lanthanide component in the form of the corresponding hydrous oxide or oxyhalide during the preparation of the preferred carrier material, alumina. This method typically involves the addition of a suitable sol-soluble or sol-dispersible lanthanide compound such as the lanthanide trichloride, lanthanide oxide, and the like to the alumina hydrosol and then combining the lanthanide-containing hydrosol with a suitable gelling agent and dropping the resulting mixture into an oil bath, etc., as explained in detail hereinbefore. Alternatively, the lanthanide compound can be added to the gelling agent. After drying and calcining the resulting gelled carrier material in air, an intimate combination of alumina and lanthanide oxide and/or oxychloride is obtained.

One preferred method of incorporating the lanthanide component into the catalytic composite involves utilization of a soluble, decomposable compound of lanthanide in solution to impregnate the porous carrier material. In general, the solvent used in this impregnation step is selected on the basis of the capability to dissolve the desired lanthanide compound and to hold it in solution until it is evenly distributed throughout the carrier material without adversely affecting the carrier material or the other ingredients of the catalyst. Suitable solvents comprise alcohols, ethers, acids, and the like, with an aqueous, acidic solution being preferred. Thus, the lanthanide component may be added to the carrier material by commingling the carrier with an aqueous acidic solution of suitable lanthanide salt, complex, or compound such as a nitrate, chloride, fluoride, organic alkyl, hydroxide, oxide, and the like compounds. Suitable acids for use in the impregnation solution are: inorganic acids such as hydrochloric acid, nitric acid, and the like, and strongly acidic organic acids such as oxalic acid, malonic acid, citric acid, and the like. The lanthanide component can be impregnated into the carrier either prior to, simultaneously with, or after the platinum-group metal component.

As an alternative to a uniform distribution of the lanthanide in the carrier, a surface-layer lanthanide metal may be incorporated into the catalyst particle in any manner suitable to effect a decreasing gradient of the metal from the surface to the center of the particle. Preferably, the metal is impregnated into the support as a compound which decomposes upon contact with the carrier, releasing the metal at or near the surface of the particle. Other means, which do not limit the invention, include using a compound of the metal which complexes with the carrier or which does not penetrate into the interior of the particle. An example is a multi-dentated ligand, such as carboxylic acids or metal compounds containing amino groups, thiol groups, phosphorus groups or other polar groups which can bond strongly to an oxide support. Alternatively, the lanthanide metal may be incorporated into the catalyst by spray impregnation.

Optionally the catalyst may also contain other components or mixtures thereof which act alone or in concert as catalyst modifiers to improve activity, selectivity or stability. Some known catalyst modifiers include rhenium, indium, cobalt, nickel, iron, tungsten, molybdenum, chromium, bismuth, antimony, zinc, cadmium and copper. Catalytically effective amounts of these components may be added in any suitable manner to the carrier material during or after its preparation or to the catalytic composite before, while or after other components are being incorporated.

An optional component of the catalyst, particularly useful in hydrocarbon conversion embodiments of the present invention comprising dehydrogenation, dehydrocyclization, or hydrogenation reactions, is an alkali or alkaline-earth metal component. More precisely, this optional ingredient is selected from the group consisting of the compounds of the alkali metals—cesium, rubidium, potassium, sodium, and lithium—and the compounds of the alkaline earth metals—calcium, strontium, barium, and magnesium. Generally, good results are obtained in these embodiments when this component constitutes about 0.01 to about 5 mass % of the composite, calculated on an elemental basis. This optional alkali or alkaline earth metal component can be incorporated into the composite in any of the known ways with impregnation with an aqueous solution of a suitable water-soluble, decomposable compound being preferred.

As heretofore indicated, it is necessary to employ at least one oxidation step in the preparation of the catalyst. The conditions employed to effect the oxidation step are selected to convert substantially all of the metallic components within the catalytic composite to their corresponding oxide form. The oxidation step typically takes place at a temperature of from about 370° to about 600° C. An oxygen atmosphere is employed typically comprising air. Generally, the oxidation step will be carried out for a period of from about 0.5 to about 10 hours or more, the exact period of time being that required to convert substantially all of the metallic components to their corresponding oxide form. This time will, of course, vary with the oxidation temperature employed and the oxygen content of the atmosphere employed.

In addition to the oxidation step, a halogen adjustment step may also be employed in preparing the catalyst. As heretofore indicated, the halogen adjustment step may serve a dual function. First, the halogen adjustment step may aid in homogeneous dispersion of the Group IVA(IUPAC 14) metal and other metal component. Additionally, the halogen adjustment step can serve as a means of incorporating the desired level of halogen into the final catalytic composite. The halogen adjustment step employs a halogen or halogen-containing compound in air or an oxygen atmosphere. Since the preferred halogen for incorporation into the catalytic composite comprises chlorine, the preferred halogen or halogen-containing compound utilized during the halogen adjustment step is chlorine, HCl or precursor of these compounds. In carrying out the halogen adjustment step, the catalytic composite is contacted with the halogen or halogen-containing compound in air or an oxygen atmosphere at an elevated temperature of from about 370° to about 600° C. It is further desired to have water present during the contacting step in order to aid in the adjustment. In particular, when the halogen component of the catalyst comprises chlorine, it is preferred to use a mole ratio of water to HCl of about 5:1 to about 100:1. The duration of the halogenation step is typically from about 0.5 to about 5 hours or more. Because of the similarity of conditions, the halogen adjustment step may take place during the oxidation step. Alternatively, the halogen adjustment step may be performed before or after the oxidation step as required by the particular method being employed to prepare the catalyst of the invention. Irrespective of the exact halogen adjustment step employed, the halogen content of the final catalyst should be such that there is sufficient halogen to comprise, on an elemental basis, from about 0.1 to about 10 mass % of the finished composite.

In preparing the catalyst, it is also necessary to employ a reduction step. The reduction step is designed to reduce substantially all of the platinum-group metal component to the corresponding elemental metallic state and to ensure a relatively uniform and finely divided dispersion of this component throughout the refractory inorganic oxide. The lanthanide is maintained in an elevated oxidation state, although the preferred Sm, Eu or Yb are optimally reduced to the +2 oxide as described hereinbefore. It is preferred that the reduction step take place in a substantially water-free environment. Preferably, the reducing gas is substantially pure, dry hydrogen (i.e., less than 20 volume ppm water). However, other reducing gases may be employed such as CO, nitrogen, etc. Typically, the reducing gas is contacted with the oxidized catalytic composite at conditions including a reduction temperature of from about 315° to about 650° C. for a period of time of from about 0.5 to 10 or more hours effective to reduce substantially all of the platinum-group metal component to the elemental metallic state. The reduction step may be performed prior to loading the catalytic composite into the hydrocarbon conversion zone or it may be performed in situ as part of a hydrocarbon conversion process start-up procedure and/or, with respect to the formation of lanthanide +2 oxides, during reforming of the hydrocarbon feedstock. However, if this in-situ technique is employed, proper precautions must be taken to predry the hydrocarbon conversion plant to a substantially water-free state and a substantially water-free hydrogen-containing reduction gas should be employed.

Optionally, the catalytic composite may be subjected to a presulfiding step. The optional sulfur component may be incorporated into the catalyst by any known technique.

The catalyst of the present invention has particular utility as a hydrocarbon conversion catalyst. The hydrocarbon which is to be converted is contacted with the catalyst at hydrocarbon-conversion conditions, which include a temperature of from 40° to 300° C., a pressure of from atmospheric to 200 atmospheres absolute and liquid hourly space velocities from about 0.1 to 100 $hr^{-1}$. The catalyst is particularly suitable for catalytic reforming of gasoline-range feedstocks, and also may be used for dehydrocyclization, isomerization of aliphatics and aromatics, dehydrogenation, hydrocracking, disproportionation, dealkylation, alkylation, transalkylation, oligomerization, and other hydrocarbon conversions.

In the preferred catalytic reforming embodiment, hydrocarbon feedstock and a hydrogen-rich gas are preheated and charged to a reforming zone containing typically two to five reactors in series. Suitable heating means are provided between reactors to compensate for the net endothermic heat of reaction in each of the reactors. The reactants may contact the catalyst in individual reactors in either upflow, downflow, or radial flow fashion, with the radial flow mode being preferred. The catalyst is contained in a fixed-bed system or, preferably, in a moving-bed system with associated continuous catalyst regeneration. Alternative approaches to reactivation of deactivated catalyst are well known to those skilled in the art, and include semiregenerative operation in which the entire unit is shut down for catalyst regeneration and reactivation or swing-reactor operation in which an individual reactor is isolated from the system, regenerated and reactivated while the other reactors remain on-stream. The preferred continuous catalyst regeneration in conjunction with a moving-bed system is disclosed, inter alia, in U.S. Pat. Nos. 3,647,680; 3,652,231; 3,692,496; and 4,832,291, all of which are incorporated herein by reference.

Effluent from the reforming zone is passed through a cooling means to a separation zone, typically maintained at about 0° to 65° C., wherein a hydrogen-rich gas is separated from a liquid stream commonly called "unstabilized reformate". The resultant hydrogen stream can then be recycled through suitable compressing means back to the reforming zone. The liquid phase from the separation zone is typically withdrawn and processed in a fractionating system in order to adjust the butane concentration, thereby controlling front-end volatility of the resulting reformate.

Operating conditions applied in the reforming process of the present invention include a pressure selected within the range of about 100 kPa to 7 MPa (abs). Particularly good results are obtained at low pressure, namely a pressure of about 350 to 2500 kPa (abs). Reforming temperature is in the range from about 315° to 600° C., and preferably from about 425° to 565° C. As is well known to those skilled in the reforming art, the initial selection of the temperature within this broad range is made primarily as a function of the desired octane of the product reformate considering the characteristics of the charge stock and of the catalyst. Ordinarily, the temperature then is thereafter slowly increased during the run to compensate for the inevitable deactivation that occurs to provide a constant octane product. Sufficient hydrogen is supplied to provide an amount of about 1 to about 20 moles of hydrogen per mole of hydrocarbon feed entering the reforming zone, with excellent results being obtained when about 2 to about 10 moles of hydrogen are used per mole of hydrocarbon feed. Likewise, the liquid hourly space velocity (LHSV) used in reforming is selected from the range of about 0.1 to about 10 $hr^{-1}$, with a value in the range of about 1 to about 5 $hr^{-1}$ being preferred.

The hydrocarbon feedstock that is charged to this reforming system preferably is a naphtha feedstock comprising naphthenes and paraffins that boil within the gasoline range. The preferred feedstocks are naphthas consisting principally of naphthenes and paraffins, although, in many cases, aromatics also will be present. This preferred class includes straight-run gasolines, natural gasolines, synthetic gasolines, and the like. As an alternative embodiment, it is frequently advantageous to charge thermally or catalytically cracked gasolines, partially reformed naphthas, or dehydrogenated naphthas. Mixtures of straight-run and cracked gasoline-range naphthas can also be used to advantage. The gasoline-range naphtha charge stock may be a full-boiling gasoline having an initial ASTM D-86 boiling point of from about 40–80° C. and an end boiling point within the range of from about 160–220° C., or may be a selected fraction thereof which generally will be a higher-boiling fraction commonly referred to as a heavy naphtha—for example, a naphtha boiling in the range of 100–200° C. If the reforming is directed to production of one or more of benzene, toluene and xylenes, the boiling range may be principally or substantially within the range of 60°–150° C. In some cases, it is also advantageous to charge pure hydrocarbons or mixtures of hydrocarbons that have been recovered from extraction units—for example, raffinates from aromatics extraction or straight-chain paraffins—which are to be converted to aromatics.

It is generally preferred to utilize the present invention in a substantially water-free environment. Essential to the achievement of this condition in the reforming zone is the control of the water level present in the feedstock and the hydrogen stream which is being charged to the zone. Best results are ordinarily obtained when the total amount of water entering the conversion zone from any source is held to a level less than 50 ppm and preferably less than 20 ppm, expressed as weight of equivalent water in the feedstock. In general, this can be accomplished by careful control of the water present in the feedstock and in the hydrogen stream. The feedstock can be dried by using any suitable drying means known to the art such as a conventional solid adsorbent having a high selectivity for water; for instance, sodium or calcium crystalline aluminosilicates, silica gel, activated alumina, molecular sieves, anhydrous calcium sulfate, high surface area sodium, and the like adsorbents. Similarly, the water content of the feedstock may be adjusted by suitable stripping operations in a fractionation column or like device. In some cases, a combination of adsorbent drying and distillation drying may be used advantageously to effect almost complete removal of water from the feedstock. Preferably, the feedstock is dried to a level corresponding to less than 20 ppm of $H_2O$ equivalent.

It is preferred to maintain the water content of the hydrogen stream entering the hydrocarbon conversion zone at a level of about 10 to about 20 volume ppm or less. In the cases where the water content of the hydrogen stream is above this range, this can be conveniently accomplished by contacting the hydrogen stream with a suitable desiccant such as those mentioned above at conventional drying conditions.

It is a preferred practice to use the present invention in a substantially sulfur-free environment. Any control means known in the art may be used to treat the naphtha feedstock which is to be charged to the reforming reaction zone. For example, the feedstock may be subjected to adsorption processes, catalytic processes, or combinations thereof. Adsorption processes may employ molecular sieves, high surface area silica-aluminas, carbon molecular sieves, crystalline aluminosilicates, activated carbons, high surface area metallic containing compositions, such as nickel or copper and the like. It is preferred that these feedstocks be treated by conventional catalytic pretreatment methods such as hydrorefining, hydrotreating, hydrodesulfurization, etc., to remove substantially all sulfurous, nitrogenous and water-yielding contaminants therefrom, and to saturate any olefins that may be contained therein. Catalytic processes may employ traditional sulfur reducing catalyst formulations known to the art including refractory inorganic oxide supports containing metals selected from the group comprising Group VI-B(6), Group II-B(12), and Group VIII(IUPAC 8–10) of the Periodic Table.

One embodiment of the invention involves the process of converting a naphtha feedstock at catalytic dehydrocyclization conditions. In particular, the preferred naphtha feedstock comprises $C_6$–$C_8$ nonaromatic hydrocarbons. Dehydrocyclization conditions include a pressure of from about 100 kPa to 4 MPa (abs), with the preferred pressure being from about 200 kPa to 1.5 MPa, a temperature of from about 350° to 650° C., and a liquid hourly space velocity of from about 0.1 to about 10 $hr^{-1}$. Preferably, hydrogen may be employed as a diluent. When present, hydrogen may be circulated at a rate of from about 0.2 to about 10 moles of hydrogen per mole of feedstock hydrocarbon.

It is preferred that the naphtha feedstock of the alternative dehydrocyclization process embodiment comprises a high proportion of paraffins, as the purpose of a dehydrocyclization process is to convert paraffins to aromatics. Because of the high value of $C_6$–$C_8$ aromatics, it is additionally preferred that the naphtha feedstock comprise $C_6$–$C_8$ paraffins. However, notwithstanding this preference, the naphtha feedstock may comprise naphthenes, aromatics, and olefins in addition to $C_6$–$C_8$ paraffins.

The following examples are presented to elucidate the catalyst and process of the present invention, demonstrating selectivity advantages over prior-art technology. These examples are offered as illustrative embodiments and should not be interpreted as limiting the claims.

EXAMPLE I

A spherical catalyst of the prior art comprising platinum and tin on alumina was prepared by conventional techniques as a control catalyst to compare against catalysts of the invention. Tin was incorporated into alumina sol according to the prior art, and the tin-containing alumina sol was oil-dropped to form 1.6 mm spheres which were steamed to dryness at about 10% LOI and calcined at 650° C. The spherical support then was impregnated with chloroplatinic acid in HCl to provide 0.38 mass % Pt in the finished catalyst. The impregnated catalyst was dried and oxychlorinated at 525° C. with 2M HCl in air and reduced with pure hydrogen at 565° C.

The finished control was designated Catalyst X and had the following approximate composition in mass %:

| | |
|---|---|
| Platinum | 0.38 |
| Tin | 0.3 |

EXAMPLE II

A spherical catalyst comprising platinum, ytterbium and tin on alumina was prepared to demonstrate the features of the invention. Tin was incorporated into alumina sol according to the prior art and the tin-containing alumina sol was oil-dropped to form 1.6 mm spheres which were steamed to dryness at about 10% LOI and calcined at 650° C. The spherical support then was impregnated with ytterbium nitrate in 3.5% nitric acid to provide 1.1% Yb in the finished catalyst at a solution-to-support ratio of 1:1. The resulting composite was steamed to dryness (~10% LOI) and calcined at 650° C. with 3% steam. The resulting calcined composite was impregnated with chloroplatinic acid in HCl to provide 0.38 mass % Pt in the finished catalyst. The impregnated catalyst was dried and oxychlorinated at 525° C. with 2M HCl in air and reduced with pure $H_2$ at 565° C.

The finished Yb-containing catalyst was designated as Catalyst A and had the following approximate composition in mass %:

| | |
|---|---|
| Ytterbium | 1.1 |
| Platinum | 0.38 |
| Tin | 0.3 |

Other catalysts containing lanthanum, samarium and dysprosium were prepared in the same manner as the ytterbium-containing catalyst. Lanthanide contents of the finished catalysts were as follows, with each catalyst having substantially the same tin and platinum contents as Catalyst A:

| | |
|---|---|
| Catalyst B | 0.9 mass % La |
| Catalyst C | 1.0 mass % Sm |
| Catalyst D | 1.1 mass % Dy |

EXAMPLE III

Pilot-plant tests were structured to compare the selectivity to aromatics in a reforming process of the catalysts of the invention and of the prior art. The tests were based on reforming naphtha over the catalysts at a pressure of 0.8 MPa (abs), liquid hourly space velocity of 3 $hr^{-1}$, and hydrogen/hydrocarbon mol ratio of 8. A range of conversion was studied by varying temperature to provide data points at 502° C., 512° C., 522° C., and 532° C. The naphtha for the comparative tests was a hydrotreated petroleum-derived naphtha derived from a paraffinic mid-continent crude oil which had the following characteristics:

| | |
|---|---|
| Specific gravity | 0.737 |
| Distillation, ASTM D-86, ° C. | |
| IBP | 87 |
| 10% | 97 |
| 50% | 116 |
| 90% | 140 |
| EP | 159 |
| Mass % paraffins | 60 |
| naphthenes | 27 |
| aromatics | 13 |

Figure 1:
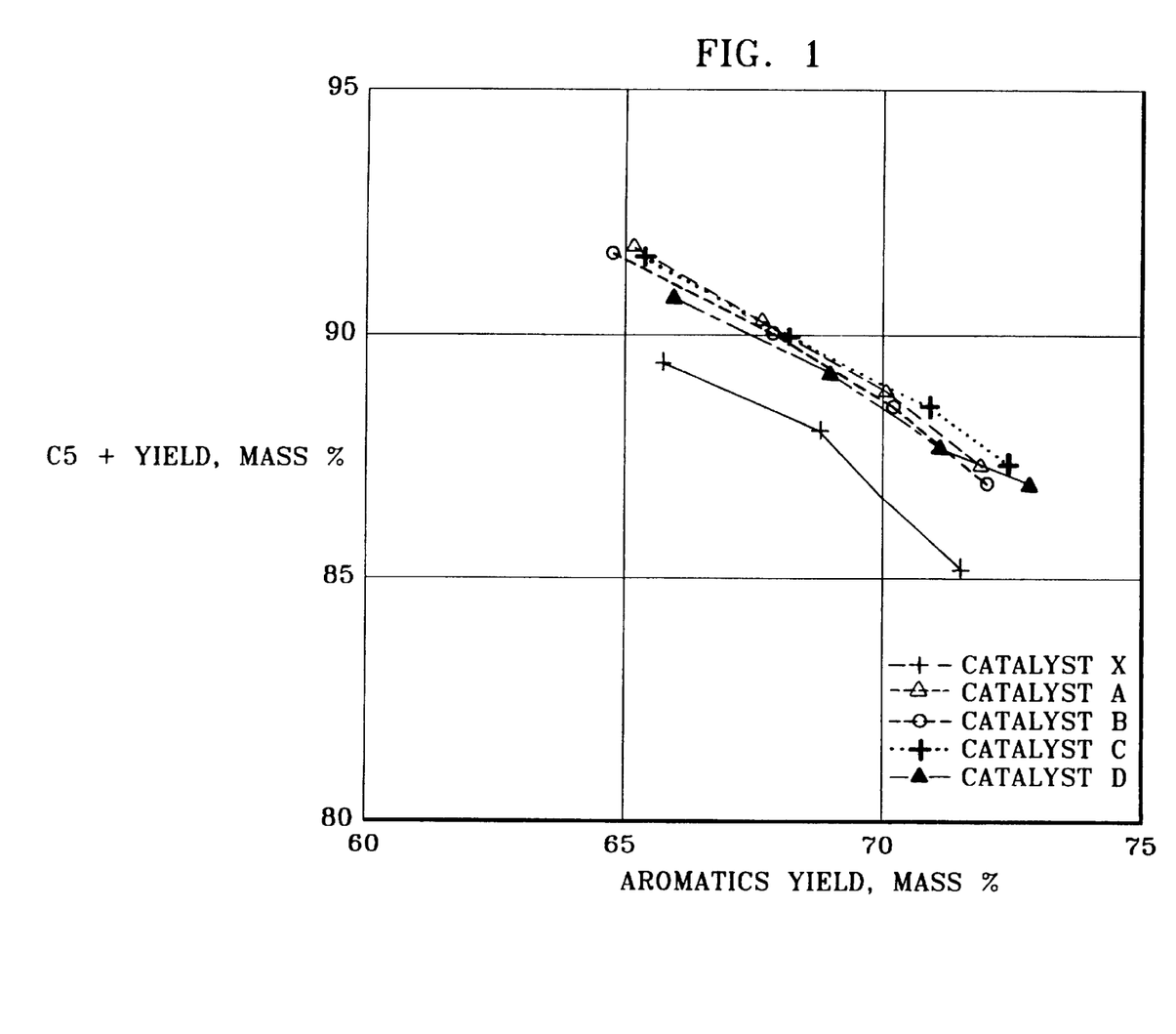
FIG. 1 shows $C_5+$ vs. aromatics yield when processing a naphtha feedstock using catalysts of the invention containing lanthanides in comparison to a control catalyst.

The results are shown as $C_5$+ yield vs. aromatics yield in FIG. 1 for Catalysts A, B, C, D, and X. Aromatics yield is defined as the mass-% yield of (benzene+toluene+$C_8$ aromatics+$C_9$+ aromatics). Since a high aromatics yield usually is the principal objective of catalytic reforming, high aromatics yield relative to $C_5$+ yield is an indication of high selectivity. Catalysts A, B, C, and D of the invention show about 2–3% higher aromatics yield at the same $C_5$+ yield.

EXAMPLE IV

Figure 2:
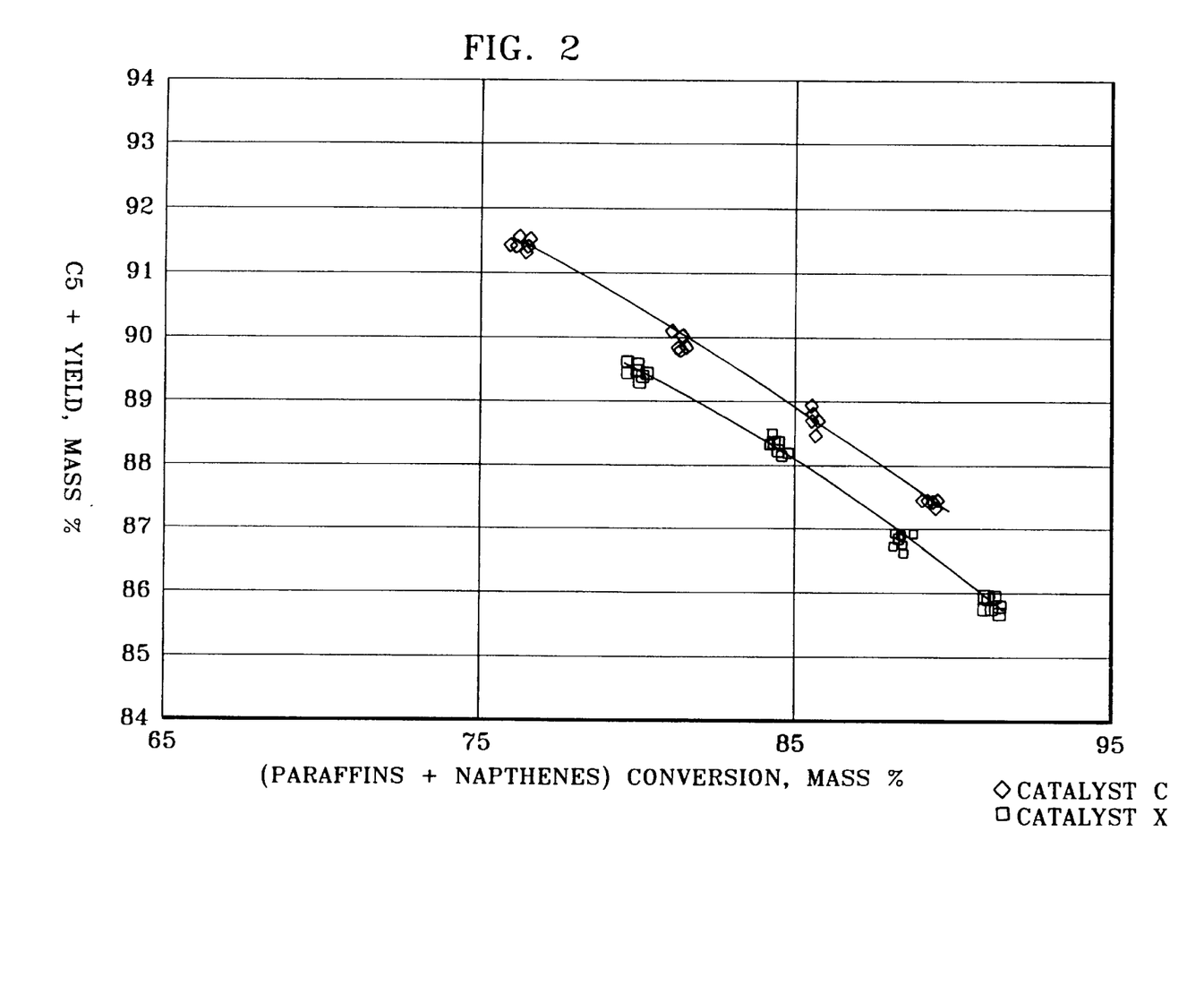
FIG. 2 compares reforming selectivity for catalysts of the prior art and of the present invention when processing a naphtha feedstock.

Pilot-plant tests were structured to compare the selectivity and activity of Catalysts C and X for the reforming of a naphtha feedstock. The naphtha for the comparative tests was the same as used in Example III. Each test was based on reforming conditions comprising a pressure of 0.8 MPa (abs), a liquid hourly space velocity of 3 $hr^{-1}$, and a hydrogen/hydrocarbon ratio of 8. A range of conversion was studied by varying temperature to provide several data points each at 502° C., 512° C., 522° C., and 532° C. Conversion of (paraffins+naphthenes) at each temperature was 2–4% higher for catalyst X, but selectivity as yield of $C_5$+ product was higher over the entire range of conversion for Catalyst C. The plot of selectivity vs. conversion is shown as FIG. 2.

EXAMPLE V

Three spherical catalysts comprising platinum, europium and tin on alumina were prepared to demonstrate the features of the invention. Tin was incorporated into a spherical alumina support according to the prior art as described in Example II. The spherical support then was impregnated with europium nitrate in 3.5% nitric acid to provide three different levels of Eu in the finished catalyst at a solutionto-support ratio of 1:1. The resulting composites were steamed to dryness (~10% LOI) and calcined at 650° C. with 3% steam. The resulting calcined composites were impregnated with chloroplatinic acid in HCl to provide 0.38 mass % Pt in the finished catalyst. The impregnated catalysts were dried and oxychlorinated at 525° C. with 2M HCl in air and reduced with pure $H_2$ at 565° C. The finished Eu-containing catalysts were designated as Catalysts E, F and G and had the following approximate composition in mass %:

| Catalyst | E | F | G |
|---|---|---|---|
| Europium | 0.30 | 0.51 | 1.1 |
| Platinum | 0.37 | 0.37 | 0.38 |
| Tin | 0.3 | 0.3 | 0.3 |

EXAMPLE VI

Catalyst G was tested in comparison to Catalyst X of the art to determine the presence of EuO pursuant to reduction. A temperature-programmed reduction procedure was effected using 5 mole-% $H_2$ in Ar, with ramping from room temperature to 600° C. at a rate of 10° C. per minute. Hydrogen consumption for catalyst G exceeded that for Catalyst X by 33 μmoles/gram, indicating over 90% reduction of $Eu^{+3}$ to $Eu^{+2}$.

EXAMPLE VII

Pilot-plant tests were structured to compare the selectivity and activity of Catalysts E, F and G with that of Catalyst X for the reforming of a naphtha feedstock. The naphtha for the comparative tests was the same that of Example III.

Each test was based on reforming conditions comprising a pressure of 0.8 MPa (abs), a liquid hourly space velocity of 3 $hr^{-1}$, and a hydrogen/hydrocarbon ratio of 8. A range of conversion was studied by varying temperature to provide several data points each at 502° C., 512° C., 522° C., and 532° C. Comparative conversion (of paraffins+naphthenes), yield of $C_5+$ product and yield of aromatics all are expressed below in mass-%:

|  | X | E | F | G |
|---|---|---|---|---|
| 502° C. | | | | |
| Conversion | 79.5 | 75.6 | 70.1 | 58.9 |
| $C_5$ + yield | 89.5 | 91.6 | 92.9 | 96.2 |
| Aromatics yield | 65.8 | 65.1 | 61.5 | 52.2 |
| 512° C. | | | | |
| Conversion | 84.7 | 81.2 | 76.9 | 65.3 |
| $C_5$ + yield | 88.1 | 90.0 | 91.7 | 95.2 |
| Aromatics yield | 68.8 | 68.4 | 66.6 | 58.3 |
| 522° C. | | | | |
| Conversion | 88.1 | 85.2 | 82.3 | 70.8 |
| $C_5$ + yield | 86.7 | 88.8 | 90.3 | 94.0 |
| Aromatics yield | 70.0 | 70.3 | 69.6 | 62.9 |
| 532° C. | | | | |
| Conversion | 91.6 | 89.2 | 86.6 | 75.5 |
| $C_5$ + yield | 85.2 | 87.4 | 88.9 | 92.6 |
| Aromatics yield | 71.5 | 72.0 | 71.9 | 66.6 |

Figure 3:
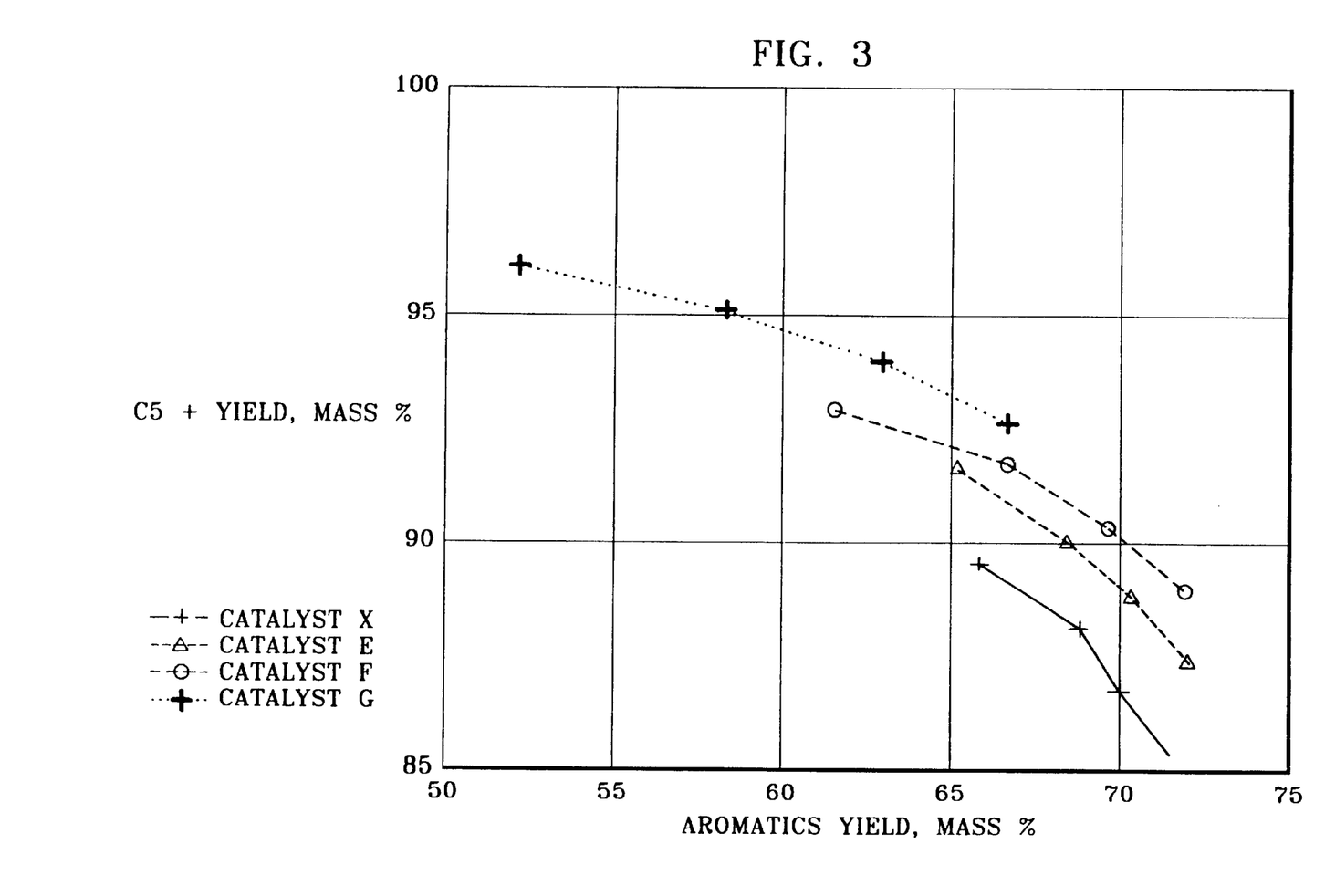
FIG. 3 shows $C_5+$ vs. aromatics yield for three Eu-containing catalysts in comparison to a reference catalyst not containing Eu.

FIG. 3 is a plot of aromatics yield vs. $C_5+$ yield derived from the above values, showing higher aromatics yields at the same $C_5+$ yields for catalysts of the invention.

Figure 4:
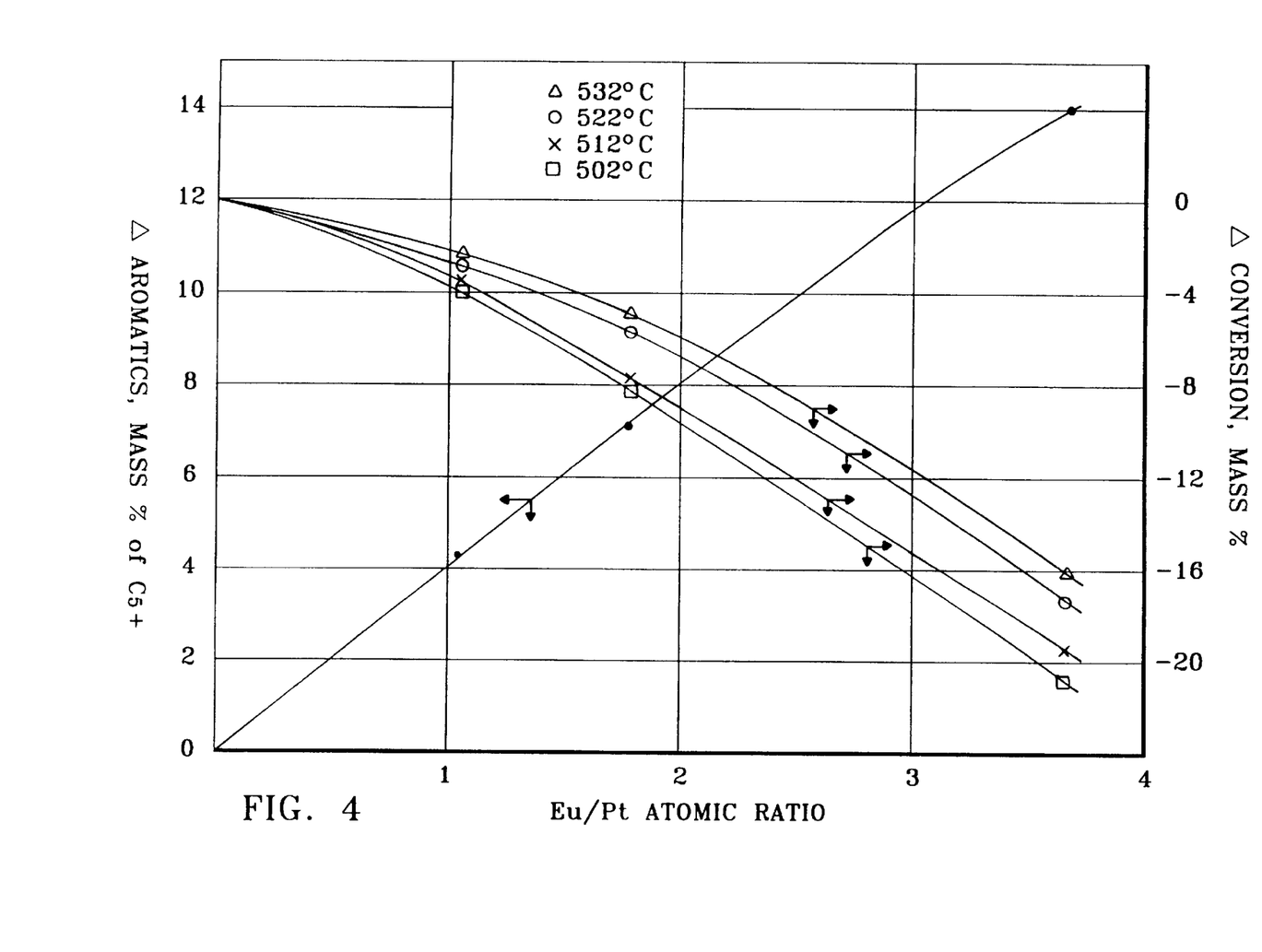
FIG. 4 shows the relative activity and selectivity of Eu-containing catalysts as a function of Eu content.

Activity and selectivity relationships were developed from the above values and illustrated in FIG. 4. Activity was calculated as the % decrease in conversion from the base Catalyst X for each temperature, and plotted against the Eu/Pt atomic ratio for the respective catalysts. Selectivity was derived from FIG. 3 by measuring the change in aromatics yields between catalysts over a common range of $C_5+$ yields and dividing by the $C_5+$ yield, i.e., an average of Δ aromatics yield expressed as a % of $C_5+$ yield. In plotting the latter on FIG. 4, the extension of the line to the high Eu/Pt ratio of Catalyst G is shown as a lighter line since there is only a small overlap of the Catalyst G line with those of the other catalysts on FIG. 3.

FIG. 4 shows an accelerating drop in conversion with increasing catalyst europium content as the Eu/Pt ratio increases between 1 and 2, and the slope becomes even higher above a ratio of 2. The relationship of selectivity to Eu/Pt ratio, on the other hand, is more nearly linear. Although the selection of an Eu/Pt ratio would depend on the relative importance of selectivity and activity, very high ratios would incur a heavy activity penalty relative to the selectivity advantage.

I claim:

1. A process for the catalytic reforming of a naphtha feedstock which comprises contacting the feedstock at reforming conditions including a temperature of about 425° to 565° C., a pressure of about 350 to 2500 kPa (ga), a liquid hourly space velocity of about 1 to 5 $hr^{-1}$, and a mole ratio of hydrogen to naphtha feedstock of about 2:1 to 10:1, with a catalytic composite consisting essentially of a combination of a refractory inorganic oxide support with about 0.1 to 10 mass % of a halogen component, about 0.01 to 5 mass % on an elemental basis of a Group IVA (IUPAC 14) metal component, about 0.01 to 2 mass % on an elemental basis of a platinum-group metal component, and about 0.1 to 5 mass % on an elemental basis of a lanthanide component comprising at least one lanthanide selected from the group consisting of ytterbium, europium and samarium wherein more than about 50% of the lanthanide is present as the +2 oxide.

2. The process of claim 1 wherein the atomic ratio of lanthanide to platinum-group metal of the catalytic composite is at least about 1.3:1.

3. The process of claim 2 wherein the atomic ratio of lanthanide to platinum-group metal of the catalytic composite is at least about 1.5:1.

4. The process of claim 3 wherein the atomic ratio of lanthanide to platinum-group metal of the catalytic composite is between about 2:1 and 5:1.

5. The process of claim 1 wherein the lanthanide consists essentially of ytterbium.

6. The process of claim 1 wherein the lanthanide consists essentially of a mixture of ytterbium and europium.

7. The process of claim 1 wherein the halogen component comprises a chlorine component.

* * * * *